March 22, 1938. A. W. WIGGLESWORTH 2,112,126
MOTOR DRIVEN HEADSTOCK FOR MACHINE TOOLS
Original Filed Sept. 8, 1936  2 Sheets—Sheet 1
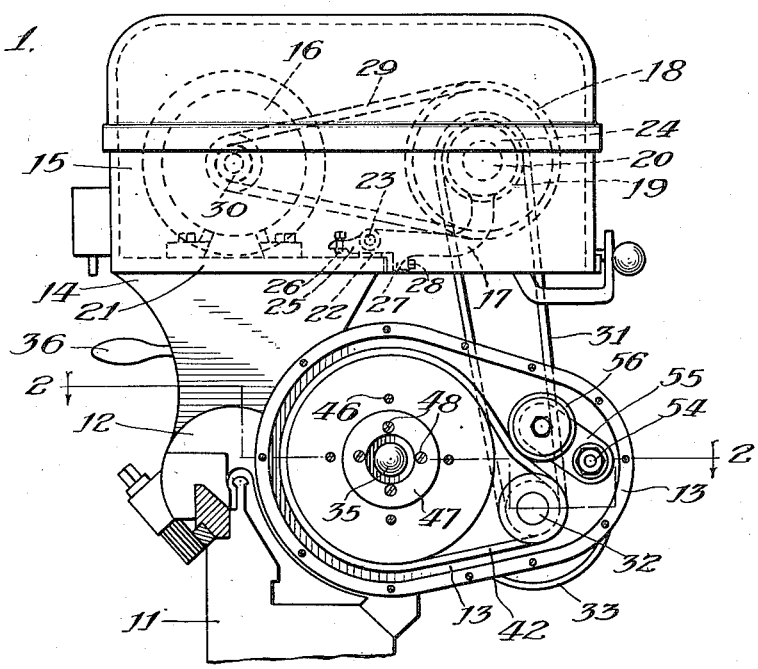
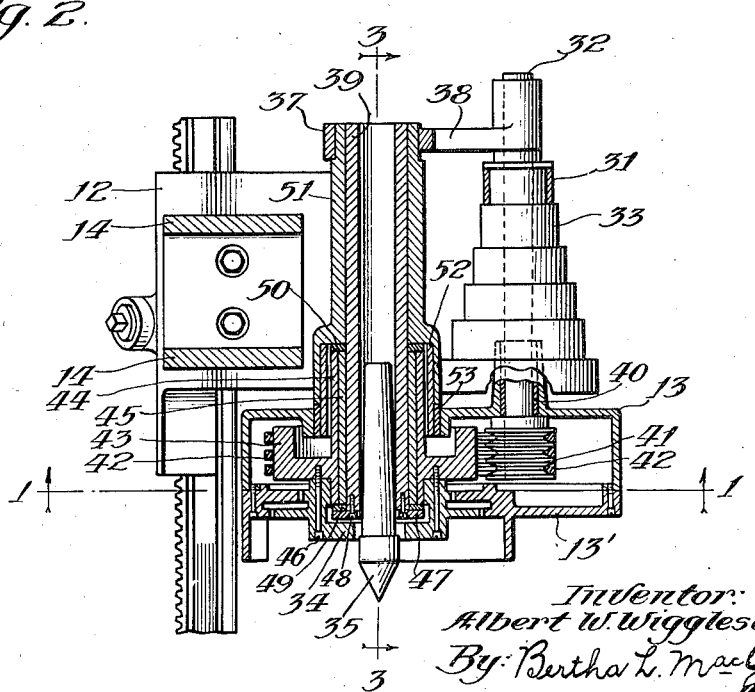

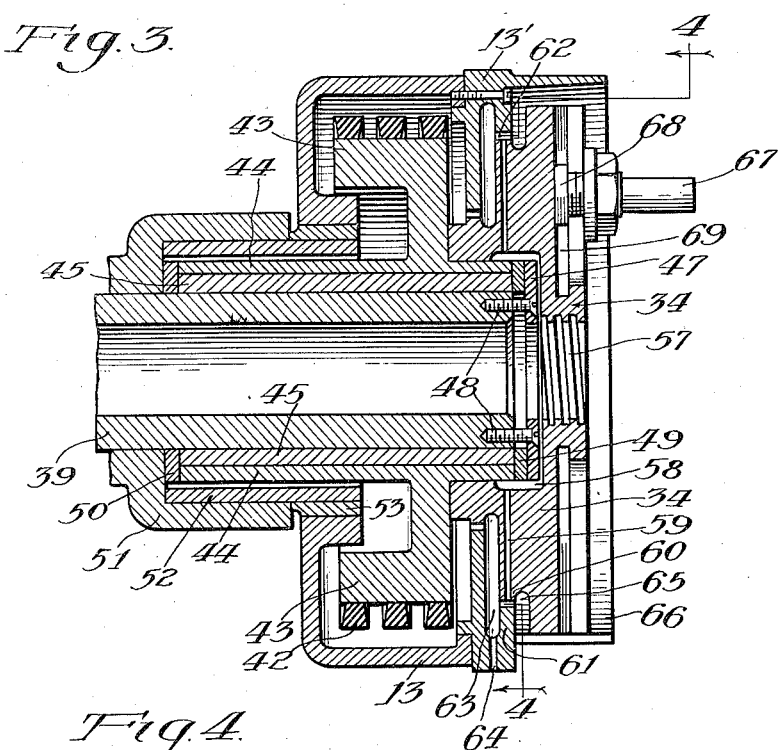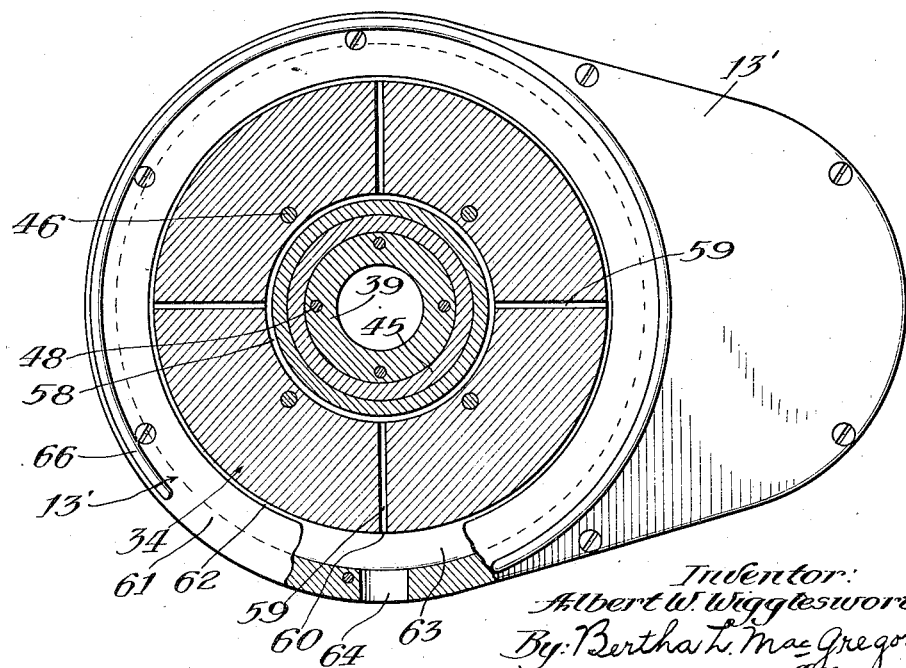

Patented Mar. 22, 1938

2,112,126

UNITED STATES PATENT OFFICE 2,112,126

MOTOR DRIVEN HEADSTOCK FOR MACHINE TOOLS

Albert W. Wigglesworth, Chicago, Ill., assignor to Hill-Clarke Machinery Co., Chicago, Ill., a corporation of Illinois Original application September 8, 1936, Serial No. 99,761. Divided and this application January 11, 1937, Serial No. 119,919

4 Claims. (Cl. 82—28)

This invention relates to motor driven headstocks for machine tools, such as grinding machines and the like.

The main object of the invention is to provide operative connections between the motor and the work engaging member whereby vibration is substantially eliminated and perfectly smooth surfaces are imparted to the work being machined. This object is best accomplished by providing a belt drive for rotating the work engaging member. Preferably a rubber belt or a plurality of rubber belts are used. Since oil deleteriously affects rubber, it is essential that the belt or belts be kept free of grease and oil, and, therefore, an object of the invention is to provide oilless bearings for the belt-driven mechanism. Such oilless bearings are injuriously affected by the water used in the operation of some machine tools, such as grinding machines and the like, and, therefore, another object of the invention is to provide means for preventing water from entering the housing which preferably encloses the driving mechanism or from otherwise coming in contact with said bearings.

This application is a division of my application Serial No. 99,761, filed September 8, 1936.

In the drawings:

Fig. 1 is a transverse, vertical sectional view, partly in elevation, taken in the plane of the line 1—1 of Fig. 2.

Fig. 2 is a horizontal sectional view taken in the plane of the broken line 2—2 of Fig. 1.

Fig. 3 is an enlarged vertical sectional view taken in the plane of the line 3—3 of Fig. 2, with the center head removed.

Fig. 4 is a transverse, vertical sectional view, partly in elevation, taken in the plane of the line 4—4 of Fig. 3.

In that embodiment of my invention shown in the drawings, a work carriage 11 is longitudinally slidable on a base, not shown. On one end of the carriage 11 is carried a headstock which cooperates with a tailstock, not shown, to support the work.

The headstock comprises a lower housing consisting of a stationary part 12, and movable parts 13 and 13', two supports 14, 14 connected to the part 12 of the housing, and a two-piece upper housing 15 on the supports 14. In the upper housing 15 are mounted a motor 16, pulley supporting frame 17, and a grooved pulley 18 and plain wide pulley 19 on a shaft 20. The motor 16 is fixedly mounted on the floor 21 which partially closes the bottom of the housing 15. Spaced apart brackets 22 on the floor 21 support a horizontal shaft 23 on which is pivotally mounted the frame 17. The upwardly curved arms 24 of the frame 17 are apertured at their upper ends for the reception of the pulley shaft 20 rotatably mounted therein. The pulley 18 is fixed on one end of the shaft 20 and the wide pulley 19 is fixed to said shaft between the arms 24 of the frame 17. One of the arms of the frame 17 is extended beyond the shaft 23 as indicated at 25 and is apertured to receive an adjusting screw 26. A depending lug 27 on said arm is apertured for the reception of an adjusting screw 28. The adjustment of the screws 26 and 28 in the end 25 and lug 27, respectively, with their ends bearing on the floor 21 of the housing, swings the frame 17 relatively to the shaft 23 and thus varies the position of the pulley 18 for the purpose of adjusting the tension of the belt 29.

The belt 29 on the pulley 30 of the motor shaft transmits power from the motor 16 through pulley 18 to shaft 20. A belt 31 on the wide pulley 19 on said shaft 20 extends through the open bottom of the housing 15 and transmits power to the drive shaft 32 through the speed-change pulley 33 on said shaft 32. The shaft 32 is operatively connected with a work driver 34 by operative connections hereinafter described. The headstock center is indicated at 35.

Speed change is accomplished by moving the belt 31 longitudinally of the wide pulley 19 and stepped or cone pulley 33. In order to permit the belt 31 to be moved, it is necessary to relieve the belt 31 of tension and this is accomplished by pressing downwardly on a lever 36 which is rigidly connected to the part 37 of the housing 13, said housing 13 and arm 38 being pivotally mounted to rotate about the hollow center head shaft 39 which is in alignment with the center 35. The arm 38 terminates in a bearing for the shaft 32. The downward actuation of the lever 36 and pivotal movement of the arm 38 (the latter being pivotally connected with shaft 32), raises the shaft 32, housing 13 and the change-speed pulley 33 and relieves the belt 31 of tension, so that it may be moved on the pulleys 19 and 33 to vary the speed of the shaft 32. When the lever 36 is released after adjustment of the belt 31 on pulleys 19 and 33, the pulley 33 with shaft 32 and associated housing 13 move by gravity to the position shown in Figs. 1 and 2 in which the belt 31 is under proper tension for operating purposes.

Referring to the operative connections between the shaft 32 and the work driver 34, one end of the shaft 32 is mounted in an oilless bearing 40 in the housing 13. Said shaft end carries a pulley 41 which, preferably, is a multi-grooved type pulley, connected by a plurality of belts 42 to a pulley 43. The pulley 43 has an integral elongated bearing sleeve 44 which surrounds an oilless bearing 45 on the hollow center head shaft 39 in which the center 35 is mounted. In the present embodiment the center 35 is stationary and the work driver 34 is rotated about the shaft 39, but obviously the center 35 could be rotatably connected if desired. The work driver 34 is secured by bolts 46 to the pulley 43. A flat apertured disc 47 is secured to the end of the shaft 39 by bolts 48 for retaining an oilless washer 49 in place adjacent the forward ends of the pulley sleeve 44 and bearing 45. Another oilless washer 50 is interposed between the other ends of the bearing 45 and pulley sleeve 44 and an offset shoulder formed in the sleeve 51 which houses the shaft 39 and is part of the fixed housing 12. A bearing 52 is located between the pulley sleeve 44 and the sleeve 51, and between the pulley sleeve 44 and a member 53 which moves with the movable housing 13—13'.

In the present embodiment the pulley 43 with its sleeve 44 and connected work driver 34 rotate about the fixed shaft 39. Normally, during such operation, the housing 13 and member 53 are stationary but when it is desired to change the speed of the shaft 32, the lever 36 may be depressed, whereby the arm 38 and housing 13—13' with member 53 are pivotally moved about the shaft 39 and sleeve 51 and about the bearing 52, thereby lifting the drive shaft 32 and change speed pulley 33 to permit movement of the belt 31 on the pulley 33.

The belts 42 preferably are held under proper adjustable tension on the pulleys 41 and 43 by means more fully described in the application of which this is a division. As shown in Fig. 1, a stub shaft 54 is rigidly secured to the housing 13, and has pivotally mounted on it an arm 55 which carries an idler pulley 56, for bearing on the belt or belts 42.

All the bearings in the housing 13—13' are oilless, as heretofore described, and thus the rubber belt or belts 42, which I preferably use, cannot be deleteriously affected by oil. However, to avoid injury to the oilless bearings, contact with moisture must be avoided, and to this end means for preventing water from entering the housing or otherwise contacting the bearings are provided.

Said means are best shown in Figs. 3 and 4, in which the work driver 34 is shown in two vertical sectional views at right angles to each other, and with the center head 35 removed. Water is most likely to enter the housing through the opening 57 which is partially closed by the head 35. Said opening communicates with an annular space 58 between the work driver 34 and the forward part of the pulley sleeve 44, the disc 47 and outer edge of the washer 49. The work driver 34 has a plurality of radially extending passageways 59 in its body, communicating with said annular space 58, and extending to the peripheral edge 60 of the work driver. The edge 60 fits within the inwardly directed flange 61 of the housing 13, but the annular space 62 between the work driver edge 60 and housing flange 61 is sufficient to allow water to pass from the passageways 59 through said space 62 to a recess 63 in the housing 13 and thence out through the slot 64, or to pass from the passageways 59 through the space 62 and out through the peripheral recess 65 in the work driver. It will be noted that the flange 66 on the face of the part 61 of the housing 13' is cut away at the lower part of said housing so that water which may enter the opening 57 in the housing may pass out through the surface of the groove or recess 65 without interference by the flange 66. By providing the communicating passageways 58, 59, 62, leading out through 63 and 64 or 65, moisture is kept away from the oilless bearings in the driving mechanism, and injury to said bearings is avoided. Thus I am enabled to use a rubber belt or belts to drive the pulley 43 and attached work driver 34 without subjecting such belt or belts to oil or grease which would render them useless in a very short time.

In Fig. 3 is shown a bolt 67 with square head 68 located in one of two slots 69 in the face of the work driver, for use in connecting the work to said member.

Of course, it will be understood that either or both of the pulleys 41 and 43 may be grooved or plain, and that a single or multi-belt drive may be used.

The elimination of gears and provision of the driving means herein described enable the machine to produce exceptionally smooth work.

Changes may be made in details of construction without departing from the scope of my invention and I do not intend to be limited to the exact form shown and described, except as set forth in the appended claims.

I claim:—

1. A motor driven head stock comprising a housing, a center head shaft in the housing, a rotatable work driver, means on the shaft for driving the work engaging member, and means for preventing water from entering the housing, said means comprising a plurality of passageways in the work driver extending from its axial portion to a peripheral recess located in the edge of the work driver externally of the housing.

2. A motor driven head stock comprising a housing, a center head shaft in the housing, a centrally apertured, rotatable work driver, means on the shaft for driving the work driver, and means for preventing water from entering the housing through said aperture in the work driver, said means comprising a plurality of passageways in the work driver extending from its axial portion to its peripheral edge, an annular space between the housing wall and work driver, and a slot in the lower part of the housing wall communicating with said annular space for permitting water to pass out without entering the interior of the housing.

3. A motor driven headstock comprising a housing, a center head shaft in the housing, a rotatable work driver and pulley on the shaft, an oilless bearing between the pulley and the center head shaft in the housing, means including a rubber belt for driving said pulley and means for preventing water from entering the housing and from contacting said oilless bearing, said means comprising a plurality of passageways in the work driver extending from its axial portion to a peripheral recess located in the edge of the work driver externally of the housing.

4. A motor driven headstock comprising a housing, a center head shaft in the housing, a rotatable work driver and pulley on the shaft, an oilless bearing between the pulley and the center head shaft in the housing, means including a rubber belt for driving said pulley and means for preventing water from entering the housing and from contacting said oilless bearing, said means comprising a plurality of passageways in the work driver extending from its axial portion to its peripheral edge, an annular space between the housing wall and the work driver, and a slot in the lower part of the housing wall communicating with said annular space for permitting water to pass out without entering the interior of the housing.

ALBERT W. WIGGLESWORTH.